May 1, 1934.  P. H. GEIGER  1,956,675
RECTIFYING APPARATUS
Filed May 10, 1927
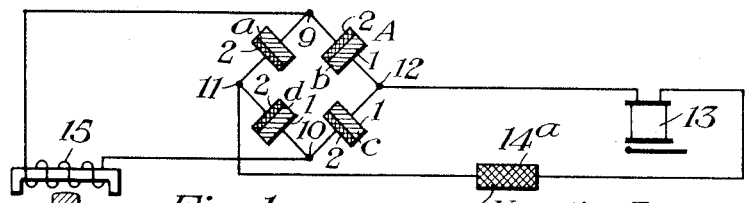
Fig. 1.
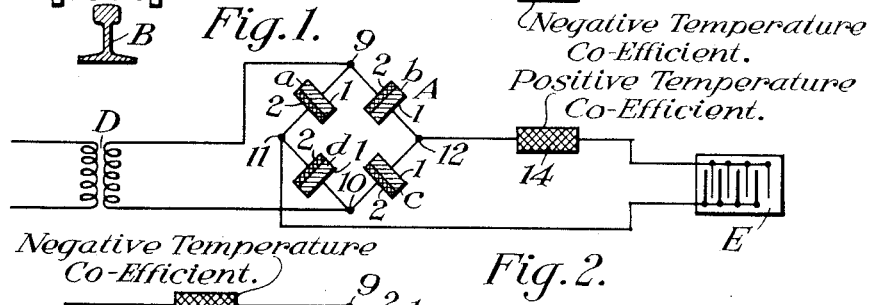
Fig. 2.
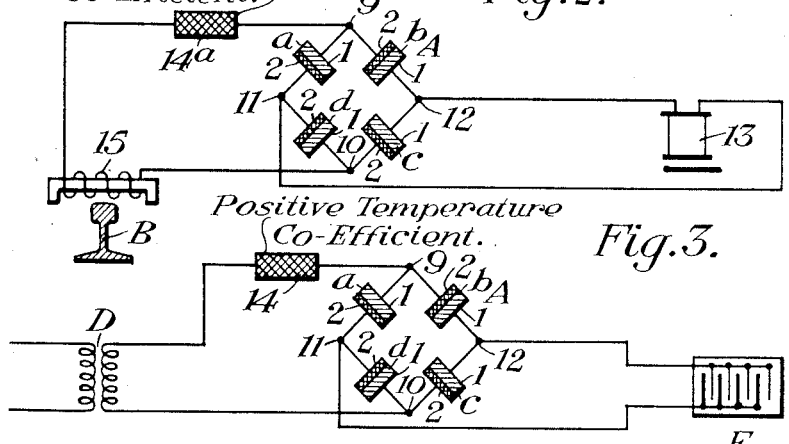
Fig. 3.
Fig. 4.
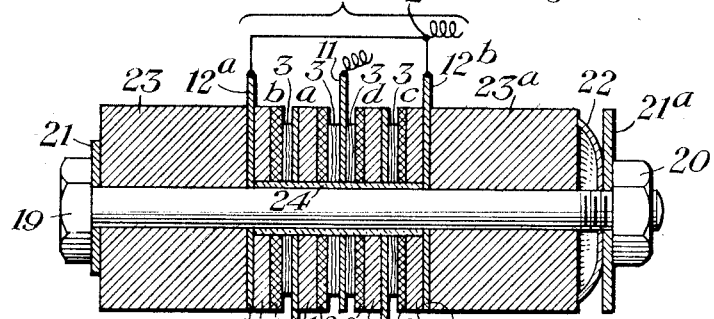
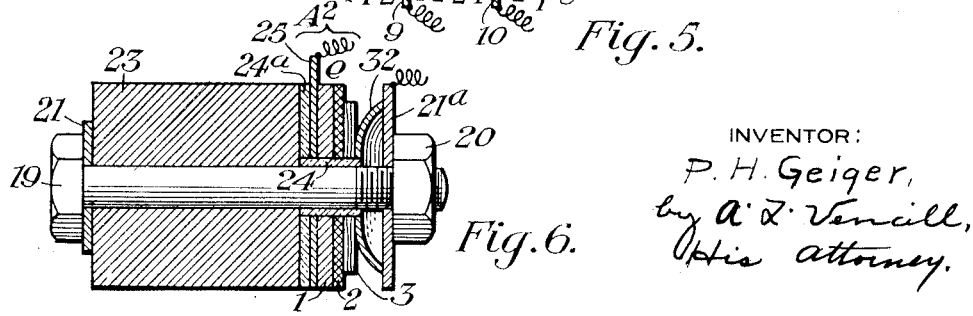
Fig. 5.
Fig. 6.
INVENTOR:
P. H. Geiger,
by A. L. Vencill,
His attorney.

Patented May 1, 1934

1,956,675

UNITED STATES PATENT OFFICE 1,956,675

RECTIFYING APPARATUS

Paul H. Geiger, Wilkinsburg, Pa., assignor to The Union Switch & Signal Company, Swissvale, Pa., a corporation of Pennsylvania Application May 10, 1927, Serial No. 190,358

32 Claims. (Cl. 175—363)

My invention relates to rectifying apparatus for transforming alternating current into substantially unidirectional current, and has for an object the provision of means for compensating for the effects of temperature changes on apparatus of this character.

This case is a continuation in part of my copending application, Serial No. 712,583, filed May 12, 1924, for Rectifying apparatus, in so far as the subject matter common to the two applications in concerned.

I will describe several forms of apparatus embodying my invention, and will then point out the novel features thereof in claims.

In the accompanying drawing, Fig. 1 is a diagrammatic view showing one form of apparatus embodying my invention. Figs. 2, 3 and 4 are views showing modified forms of the apparatus shown in Fig. 1. Fig. 5 is a vertical longitudinal sectional view showing another form of rectifying apparatus embodying my invention. Fig. 6 is a view similar to Fig. 5 showing still another form of apparatus embodying my invention.

Similar reference characters refer to similar parts in each of the several views.

Referring first to Fig. 1, the reference character A designates a rectifier comprising four units $a$, $b$, $c$ and $d$, each of which units in the form here shown is made up of a plate of copper 1 with a coating of cuprous oxide 2 formed thereon. This unit offers a lower resistance to current flowing from the oxide to the copper than to current flowing in the opposite direction. The rectifier A is supplied with alternating current from a suitable source which as here shown is a coil 15 in inductive relation to a track rail B assumed to be carrying alternating or pulsating current. The terminals of coil 15 are connected with the input terminals 9 and 10 of rectifier A, and the output terminals 11 and 12 of this rectifier are connected with a current consuming device 13 which as here shown is a relay. The four units of rectifier A are arranged in the well known manner to produce full wave rectification.

Referring now to Fig. 2, the rectifier A is here used to charge a storage battery E from a constant voltage source of alternating current, this storage battery being one example of the current consuming device set forth in certain of the claims.

Each unit $a$, $b$, etc. of rectifier A has certain characteristics which are affected by changes in temperature. One of these characteristics is the "conductance" of the unit, meaning its conductance in low resistance direction. All other conditions remaining the same, the conductance increases with increase of temperature. Another characteristic is "rectifying ratio", meaning ratio of conductivity in high resistance direction to conductivity in low resistance direction. All other conditions remaining constant, this ratio decreases with increase of temperature because the conductivity in high resistance direction increases more rapidly than conductivity in low resistance direction.

Under some conditions of use the effect of the increase in conductance due to increase in temperature will predominate over the effect of the decrease in rectifying ratio, and then the output current (uni-directional) will increase with increase of temperature unless compensation for the temperature increase is provided. This condition will obtain, for example, when the rectifier is used to supply a considerable amount of power, such as when it is used to charge a storage battery from a constant voltage source of alternating current as in Fig. 2. To compensate for this increase of output current with increase of temperature, I interpose in the circuit with rectifier A of Fig. 2 an element 14 of thermosensitive material having a positive temperature co-efficient, that is, material having the characteristic of increasing in electrical resistance with increase of temperature. In Fig. 2 the element is connected in the output circuit of the rectifier, but the element may be connected in the input circuit as shown in Fig. 4 with the same effect. The element 14 should be so located as to be subjected to the same outside temperature variations as the rectifier A. The element 14 may be so proportioned as to maintain the current supplied to battery E substantially constant under all temperature variations which will be experienced in practice.

Under other conditions of use, the effect of the decrease in rectifying ratio due to temperature increase will predominate over the effect of the increase in conductance, and then the output current will decrease with increase of temperature unless compensation is provided. This will usually be the case when the power supply is small or has extremely poor regulation as for example in the apparatus shown in Fig. 1. In this instance the compensating element 14$^a$ connected in the rectifier output circuit has a negative temperature co-efficient, that is, its resistance decreases with increase of temperature, and so it tends to maintain a constant current in relay 13 under variations in temperature. The element 14ª may be connected in the input circuit as shown in Fig. 4.

I have discovered that the output current of a rectifier unit such as those shown in Figs. 1, 2, 3 and 4 increases with increase in pressure between the elements of the unit, and in Fig. 5 I have illustrated means for utilizing this characteristic to compensate for the effect of temperature variations on the output of the rectifier. In this view the four units are supported on a bolt 19 but are insulated therefrom by a sleeve 24. These units are arranged for full wave rectification as before, and are spaced by metallic washers 9, 10, 11, 12ª and 12ᵇ which serve as terminals for the device. Wherever a terminal washer is to make contact with a cuprous oxide element 2 a layer of lead foil 3 is interposed between the two to improve the electrical connection. Also mounted on the bolt 19 are two blocks 23 and 23ª located on opposite sides of the rectifier A, and a spring washer 22 is placed at the outer end of block 23ª. The parts are all clamped together between a metal washer 21 under the head of the bolt and another metal washer 21ª under the nut 20.

I will first assume that the rectifier is to be used under the condition illustrated in Figs. 1 and 3, that is, under such condition that increase of temperature causes decrease in the output current. Compensation should then be effected by increasing the pressure in response to temperature increase, and so the bolt 19 is then made of a metal having a relatively small co-efficient of expansion such as iron, and the blocks 23, 23ª are made of a metal having a relatively large co-efficient of expansion such as zinc or aluminum. Then as the temperature increases, blocks 23, 23ª will expand more than bolt 19, and so they will cause an increase in pressure on the rectifier elements, which increase in pressure tends to increase the output and so to compensate for the decrease in output due to temperature increase.

When the rectifier of Fig. 5 is to be used under the condition illustrated in Figs. 2 and 4 wherein the output increases with increase of temperature, it is apparent that compensation should be effected by decreasing the pressure in response to increase of temperature. The bolt is then made of metal having large co-efficient of expansion, and the blocks are made of metal having small co-efficient of expansion, so that as the temperature increases the pressure decreases and thus tends to compensate for the increase of output.

The purpose of the spring washer 22 in Fig. 5 is to distribute the pressure between nut 20 and block 23ª, and to prevent damage to the parts due to pressure increase.

Referring now to Fig. 6, the rectifier, which is here designated A², comprises a single rectifier unit e mounted on a bolt 19 but insulated therefrom by a sleeve 24. A single block 23 is interposed between unit e and the washer 21, there being no block corresponding to 23ª of Fig. 5. Next to the cuprous oxide element 2 is a lead foil washer 3 and a saucer-shaped spring washer 32 is mounted on the insulating sleeve 24 with its convex face toward the lead foil washer 3. Interposed between the washer 32 and the nut 20 is a metallic washer 21ª. One terminal of the rectifier unit is taken from a metallic washer 25 which is in contact with the copper plate 1, and the other terminal is taken from the washer 21ª which connects through a spring washer 32 and the lead foil washer 3 with the cuprous oxide element 2.

When the rectifier of Fig. 6 is to be used under such condition that increase of temperature causes decrease in the output current, compensation is effected by making the bolt 19 of a metal having a relatively small co-efficient of expansion and the block 23 of a metal having a relatively large co-efficient of expansion. Then under low temperature only a relatively small portion of washer 3 is pressed into effective contact engagement with the cuprous oxide 2, and the pressure exerted on the rectifier elements is relatively small. As the temperature increases, not only is the pressure increased as explained in connection with Fig. 5, but washer 32 is also flattened out, thus increasing the portion of this washer which is pressed into effective contact engagement with the cuprous oxide 2, so that the output tends to increase due both to the increase of pressure and the increase of effective area of contact between washer 3 and oxide 2.

When the rectifier of Fig. 6 is to be used under such condition that the output increases with increase of temperature, the compensation is effected by making the bolt 19 of metal having relatively large co-efficient of expansion and the block 23 of a metal having a relatively small co-efficient of expansion. The effect of temperature variation is then just the reverse, so that increase of output due to increase of temperature is compensated for both by decrease of pressure and decrease of effective contact area between lead foil washer 3 and the oxide 2.

I have found that the load resistance of a rectifier influences the amount of compensation which is required. Under some conditions, by making the load resistance a certain value, compensation for temperature changes is not necessary. The correct value of the load resistance may be found by determining the value of load resistance which will give the maximum power output when the rectifier is at the highest temperature that will be met under practical operating conditions. By using this value or a slightly lower value for the load resistance compensation will be secured because as the temperature is progressively lowered the conditions for maximum available power will be progressively departed from thereby compensating for the increased output of the rectifier.

Although I have herein shown and described only a few forms of rectifying apparatus embodying my invention, it is understood that various changes and modifications may be made therein within the scope of the appended claims without departing from the spirit and scope of my invention.

Having thus described my invention, what I claim is:

1. In combination, a rectifier having the characteristic of varying its output in response to variations in temperature, a source of periodic energy connected with said rectifier, a current consuming device connected with said rectifier, and means responsive to changes in temperature for compensating for the effect of changes in temperature upon the output of said rectifier.

2. In combination, a rectifier having the characteristic of varying its output in response to variations in temperature, a source of periodic energy connected with said rectifier, a current consuming device connected with said rectifier, and means included in circuit with said device and responsive to changes in temperature for varying the impedance of such circuit in response to changes in temperature and thereby compensating for the effect of variations in temperature upon the output of said rectifier.

3. In combination, a rectifier having the characteristic of varying its output in response to variations in temperature, a source of periodic energy connected with said rectifier, a current consuming device connected with said rectifier, and an element included in circuit with said device and having a negative temperature co-efficient for compensating for the effect of variations in temperature on the output of said rectifier.

4. In combination, a rectifier having the characteristic of varying its output in response to variations in temperature, an input circuit for said rectifier, an output circuit for said rectifier, and an element having a negative temperature co-efficient associated with said output circuit for compensating for the effect of variations in temperature on the output of said rectifier.

5. In combination, a copper oxide rectifier, an input circuit for said rectifier, an output circuit for said rectifier, and an element having a negative temperature co-efficient included in series with said output circuit for compensating for the effect of variations in temperature on the output of said rectifier.

6. In combination, a conductor having a periodic current of substantially constant amplitude flowing therein, a winding in inductive relation with said conductor, a rectifier connected with said winding and having the characteristics of varying its output in response to variations in the temperature of the rectifier, a current consuming device connected with said rectifier, and a thermo-sensitive element having a negative temperature co-efficient connected in series with said device and subjected to the same temperature changes as the rectifier.

7. In combination, a rectifier having the characteristic of varying its output in response to changes in temperature, and thermo-sensitive means associated with said rectifier for compensating the effect of temperature upon such rectifier.

8. In combination, a source of alternating current having a relatively small capacity to supply power, a current consuming device, a rectifier interposed between said source and said device and having the characteristic of varying its output in response to variations in temperature, and an element having a negative temperature co-efficient included in the output circuit of said rectifier for compensating for the effect of changes in temperature upon the output of said rectifier.

9. In combination, a rectifier having the characteristic of varying its output in response to variations in temperature, an input circuit for said rectifier, an output circuit for said rectifier, and an element having a high temperature resistance co-efficient associated with said output circuit for compensating for the effect of variations in temperature on the output of said rectifier.

10. In combination, a copper oxide rectifier unit, and means for clamping the members of said rectifier unit together with a force which increases with increases in temperature.

11. In combination, a copper oxide rectifier unit, a contact member, means for clamping said member and said rectifier unit together, and means for varying the area of contact between said member and said rectifier unit, in accordance with changes in temperature.

12. In combination, a bolt, a copper oxide rectifier unit on said bolt, a block of material on said bolt and having a different temperature co-efficient of expansion from said bolt, and a nut on said bolt for clamping said rectifier unit and said block together.

13. In combination, a bolt, a copper oxide rectifier unit on said bolt, a block of material on said bolt and having a different temperature co-efficient of expansion from said bolt, a nut on said bolt for clamping said rectifier unit and said block together, and a resilient member interposed between said rectifier and said bolt.

14. In combination, a copper oxide rectifier unit, contact members for connecting said rectifier unit in a circuit, means for forcing said rectifier unit and said contact members together, and a block of material having a higher temperature co-efficient of expansion than said means and interposed between said means and said unit.

15. In combination, a block of material having a comparatively high temperature co-efficient of expansion, a copper oxide rectifier unit, and means having a comparatively low temperature co-efficient of expansion for clamping said block and said unit together.

16. In combination, a bolt having a comparatively low temperature co-efficient of expansion, a block of material having a comparatively high temperature co-efficient of expansion and carried on said bolt, a rectifier unit also carried on said bolt, a nut on said bolt, and a spring washer for transmitting pressure from said nut to clamp said unit and said block together.

17. In combination, a bolt having a comparatively low temperature co-efficient of expansion, a block of material having a comparatively high temperature co-efficient of expansion and carried on said bolt, a rectifier unit also carried on said bolt, a saucer-shaped washer having its convex face in contact with said rectifier, and a nut for clamping said washer, said unit, and said block together, whereby the contact area between said washer and said rectifier is increased with increases in temperature.

18. In combination, a copper oxide rectifier unit, a contact member for connecting said rectifier unit with a circuit, and means for varying the effective area of contact between said contact member and said unit in accordance with variations in temperature.

19. In combination, a rectifier, an input circuit for said rectifier, an output circuit for said rectifier, and an element having a positive temperature co-efficient of resistance included in one of said circuits for compensating for the effect of changes in temperature upon the output of said rectifier.

20. In combination, a copper oxide rectifier unit, contact members for connecting said rectifier unit in a circuit, means for forcing said rectifier unit and said contact members together, and a block of material having a lower temperature co-efficient of expansion than said means and interposed between said means and said unit.

21. In combination, a source of alternating current having a relatively large capacity to supply power, a current consuming device, a rectifier interposed between said source and said device, and an element having a positive temperature co-efficient included in circuit with said rectifier for compensating for the effect of changes in temperature upon the output of said rectifier.

22. In combination, a source of alternating current having a relatively large capacity to supply power, a current consuming device, a rectifier interposed between said source and said device, and having the characteristic of increasing its output with increases in the pressure exerted upon the rectifier, and thermo-responsive means for increasing the pressure on the rectifier in accordance with increase in the temperature of the rectifier.

23. In combination, a rectifier unit having the characteristic of varying its output in response to variations in the temperature of the unit, and means for varying the pressure on such unit in response to changes in temperature for the purpose of compensating for said changes in output.

24. In combination, a rectifier having the characteristic of varying its output in response to variations in temperature, an input circuit for the rectifier including a source of periodic energy, an element included in said input circuit and having the characteristic of varying its resistance in response to variations in temperatures, and an output circuit for the rectifier.

25. In combination, a rectifier having the characteristic of increasing its output with increases in temperature, an output circuit for said rectifier, and an input circuit for the rectifier including a source of periodic energy and an element having the characteristic of increasing its resistance with increases in temperature.

26. In combination, a copper oxide rectifier unit, contact members associated therewith, means for forcing said rectifier unit and said contact members together, and a block of material having a lower temperature coefficient of expansion than said means and interposed between said means and said unit.

27. A rectifying device comprising a plurality of copper discs, one face of each disc being coated with an oxide of copper, the conductivity of said coated discs being variable with changes in temperature and pressure, a plurality of elements and means for clamping said discs and elements together to maintain pressure between said discs, at least one of said elements being composed of a material whose temperature coefficient of expansion is materially different from that of the material of said clamping means whereby the pressure between said discs is varied inversely with the temperature of said discs.

28. A rectifier comprising metallic laminations of conductivity variable with temperature and pressure, and clamping means for holding said laminations in contact, the coefficient of thermal expansion of said clamping means being greater than that of the material of the laminations whereby the pressure varies inversely with the temperature and the conductivity is maintained substantially constant during temperature changes.

29. A rectifier comprising a plurality of copper discs, one face of each disc being coated with an oxide of copper, and a clamping means composed of zinc for holding said discs in contact whereby the conductivity of the rectifier is substantially compensated for temperature changes.

30. A rectifier comprising metallic laminations, elements of spacing material, and clamping means, the coefficient of thermal expansion of the laminations being greater than that of the spacing material, and the said coefficient of the clamping means being greater than that of the laminations whereby the pressure between the laminations varies inversely with the temperature and the conductance of the rectifier is maintained substantially constant during temperature changes.

31. A device comprising a rectifying element having a variable resistance dependent upon changes in temperature and pressure, and clamping means for exerting pressure upon said element, said clamping means being composed of at least two materials having different coefficients of expansion whereby the variation of the variable property of the element is controlled during temperature changes.

32. A rectifier of the contact type comprising a plurality of rectifying plates, a spacing element and means for clamping said plates and spacing element together to maintain a suitable electrical contact between said plates, said spacing element being of a material whose coefficient of expansion is different from that of the material of said clamping means in order to regulate the conductance of the rectifier, during temperature changes.

PAUL H. GEIGER.